(No Model.)  5 Sheets—Sheet 3.

R. & W. M. CONNABLE.
APPARATUS FOR LIFTING FISHING NETS OR LINES.

No. 548,964.  Patented Oct. 29, 1895.

WITNESSES:
C. Neveux

INVENTORS
R. Connable
W. M. Connable
BY Munn & Co.
ATTORNEYS.

(No Model.) 5 Sheets—Sheet 4.

R. & W. M. CONNABLE.
APPARATUS FOR LIFTING FISHING NETS OR LINES.

No. 548,964. Patented Oct. 29, 1895.

WITNESSES:
C. Neveux

INVENTORS
R. Connable
W M Connable
BY Munn & Co
ATTORNEYS.

(No Model.) 5 Sheets—Sheet 5.
R. & W. M. CONNABLE.
APPARATUS FOR LIFTING FISHING NETS OR LINES.
No. 548,964. Patented Oct. 29, 1895.

WITNESSES:
C. Neveux
Theo. G. Hoster

INVENTORS
R Connable
WM Connable
BY
Munn & Co
ATTORNEYS.

UNITED STATES PATENT OFFICE.

RALPH CONNABLE AND WALTER M. CONNABLE, OF PETOSKEY, MICHIGAN.

APPARATUS FOR LIFTING FISHING NETS OR LINES.

SPECIFICATION forming part of Letters Patent No. 548,964, dated October 29, 1895.

Application filed October 19, 1894. Serial No. 526,384. (No model.)

*To all whom it may concern:*

Be it known that we, RALPH CONNABLE and WALTER M. CONNABLE, of Petoskey, in the county of Emmet and State of Michigan, have invented a new and Improved Apparatus for Lifting Fishing Nets or Lines, of which the following is a full, clear, and exact description.

The object of the invention is to provide a new and improved apparatus for conveniently and rapidly lifting fishing nets or lines from the water without danger of injuring the nets, lines, or the fish contained in the nets.

The invention consists of an endless carrier provided with gripping devices for gripping a net and conveying the same forward, and means for releasing the gripping devices from the net at the delivery end of the carrier.

The invention also consists of a plurality of gripping-jaws opened by the weight or strain of the nets sufficiently to receive the net or a portion of the net between the jaws, but not enough to admit the leads, floats, or fish held on or contained in the net.

The invention also consists in an arrangement of a plurality of gripping-jaws on an endless carrier, drum, or reel having devices for automatically closing the jaws and automatically loosening the jaws.

The invention also consists in certain parts and details and combinations of the same, as will be hereinafter fully described and then pointed out in the claims.

Reference is to be had to the accompanying drawings, forming part of this specification, in which similar letters of reference indicate corresponding parts in all the views.

Figure 1:
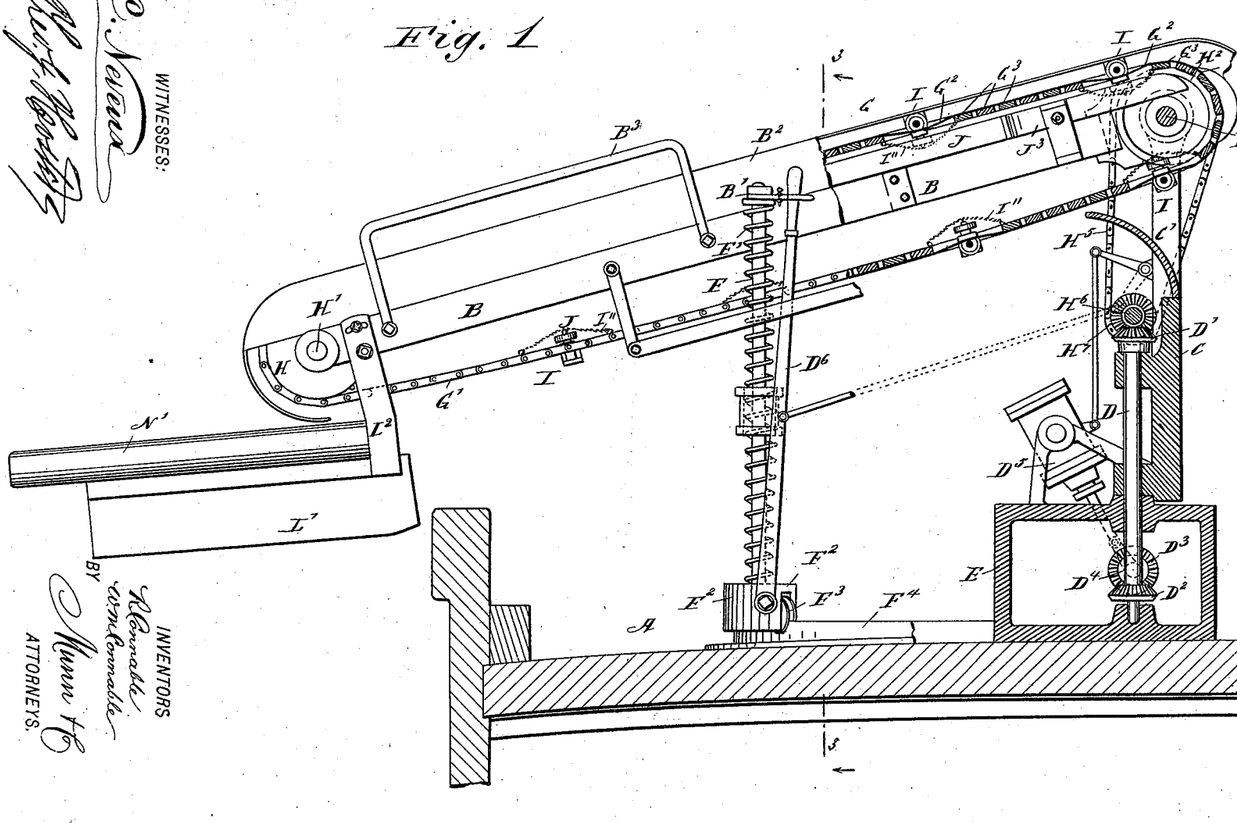
Figure 1 is side elevation of the improvement with parts in section and as applied on the deck of a vessel.

The apparatus for lifting lines and nets is mounted on the deck of a marine vessel A and is provided with a carrier having a frame B arranged on one side of the vessel and extending, preferably, in an inclined direction, so that the lower portion of the said carrier-frame reaches beyond the side of the vessel, as indicated in Fig. 1. The upper or delivery end of this carrier-frame B is journaled in the forked arm C' of a frame C, mounted to turn on a vertically-disposed shaft D, journaled in suitable bearings in a frame E, secured on the deck of the vessel A, as plainly illustrated in Fig. 1.

Figure 3:
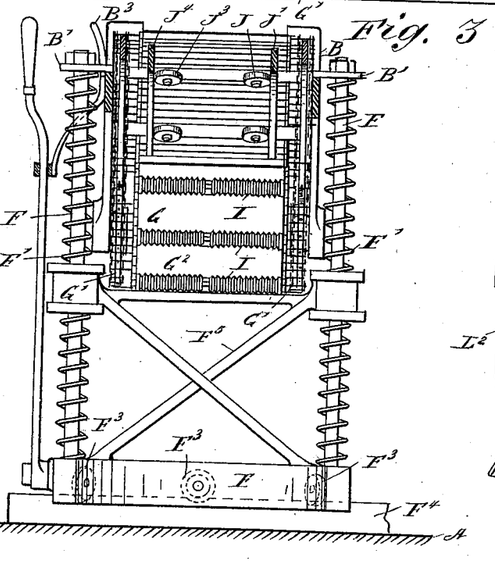
Fig. 3 is a transverse section of the same on the line 3 3 of Fig. 1.
Figures 4, 7, 8:
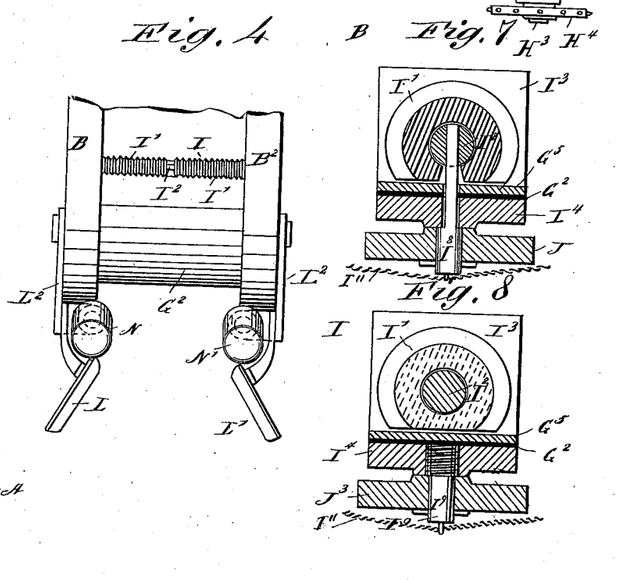
Fig. 4 is an end view of the lower portion of the machine.
Fig. 7 is an enlarged sectional side elevation of part of the gripping device on the line 7 7 of Fig. 5.
Fig. 8 is a similar view of part of the gripping device on the line 8 8 of Fig. 5.

The middle portion of the carrier-frame B is yieldingly mounted and supported, and for this purpose the said frame is provided on opposite sides with legs B', engaging vertically-disposed rods F and resting on springs F', coiled on the said rods, as shown in Figs. 1 and 3. The lower ends of the rods F are secured in a base $F^2$, preferably provided with flanged wheels $F^3$, mounted to travel on a segmental track-rail $F^4$, the center of which is in the axis of the vertically-disposed shaft D. From the base $F^2$ extends a bracing-frame $F^5$ for steadying the rods or posts F. (See Fig. 3.)

It will be seen that by the arrangement described the carrier-frame B, with its contents, can be readily swung sidewise to the right or left, the shaft D being the fulcrum, and the wheeled base $F^2$, with the rods F and springs F', forming a support for the said frame, which latter can also swing up and down with the pivot of the frame as the center, the springs F' yielding sufficiently for such up-and-down movement.

In the carrier-frame B is mounted to travel an endless carrier G, provided with chains G', supporting transversely-extending slats G³, connected by arms G⁴ with the links of the chains G′. If desirable, a belt G² may be used in connection with the chains and supported by the slats G³. The chains G′ of the carrier G pass over sprocket-wheels H, secured on a transversely-extending shaft H′, journaled in suitable bearings in the lower end of the carrier-frame B. The upper ends of the chains G′ pass over sprocket-wheels H², secured on a transversely-extending shaft H³, which forms the pivot of the said frame B in the forked arms C′ of the frame C, and also forms a driving-shaft for the carrier G. The shaft H³ is journaled in longitudinally-adjustable bearings arranged in the upper end of the carrier-frame B.

Figure 2:
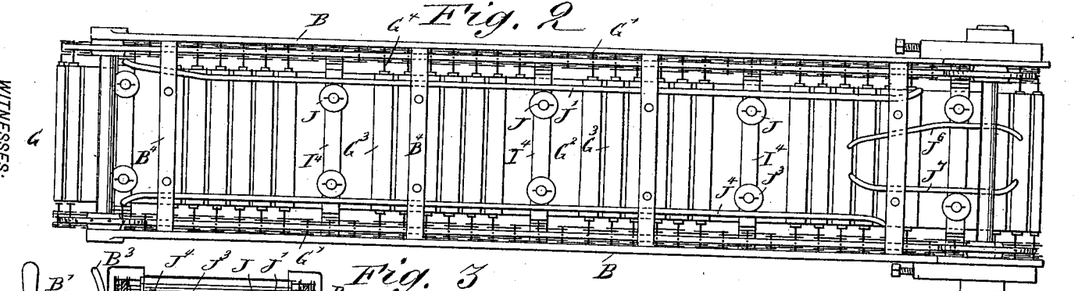
Fig. 2 is a plan view of the improvement.

In order to drive the shaft H³, one outer end thereof carries a sprocket-wheel H⁴, (see Figs. 1 and 2,) and over this sprocket-wheel H⁴ passes a sprocket-chain H⁵, also passing over a sprocket-wheel secured on a transversely-extending shaft H⁶, journaled in suitable bearings on the frame C and provided with a bevel gear-wheel H⁷ in mesh with a bevel gear-wheel D′, secured on the upper end of the shaft D. Near the lower end of the said shaft D is secured a bevel gear-wheel D² in mesh with a bevel gear-wheel D³, secured on the main driving-shaft D⁴ of an engine D⁵, mounted on the frame E, so that when the engine is set is motion a rotary motion is given by its driving-shaft D⁴ and the gear-wheels D³ D² to the driving-shaft D, which by the bevel-wheels D′ and H⁷ imparts a rotary motion to the shaft H⁶, and the latter by its sprocket wheel, the sprocket-chain H⁵, and the sprocket-wheel H⁴ imparts a rotary motion to the shaft H³, so that the sprocket-wheels H² cause a traveling motion of the carrier G in such a manner that the upper run of the said carrier travels upward along the frame B, while the lower run travels downward. The upper runs of the carrier-chains G′ are preferably protected by a hood B², forming part of the carrier-frame B.

The steam-admission valve for the engine D⁵ is controlled from a lever D⁶, pivoted on the base F² and under the control of the operator standing on the deck of the vessel A. The swinging motion of the carrier-frame B and its contents is controlled by the operator taking hold of the handle B³, formed on one side of the frame near the lower end, so that one single operator can manipulate the lever D⁶ and with his other hand the handle B³ for moving the carrier-frame B to the desired position. In the place of the engine described any known mechanical device may be applied to give motion to the carrier.

Figure 5:
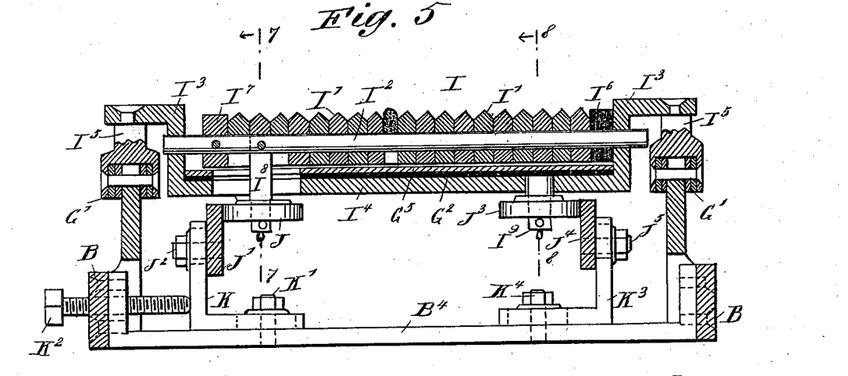
Fig. 5 is an enlarged transverse section of part of the improvement on the line 5 5 of Fig. 6.
Figure 6:
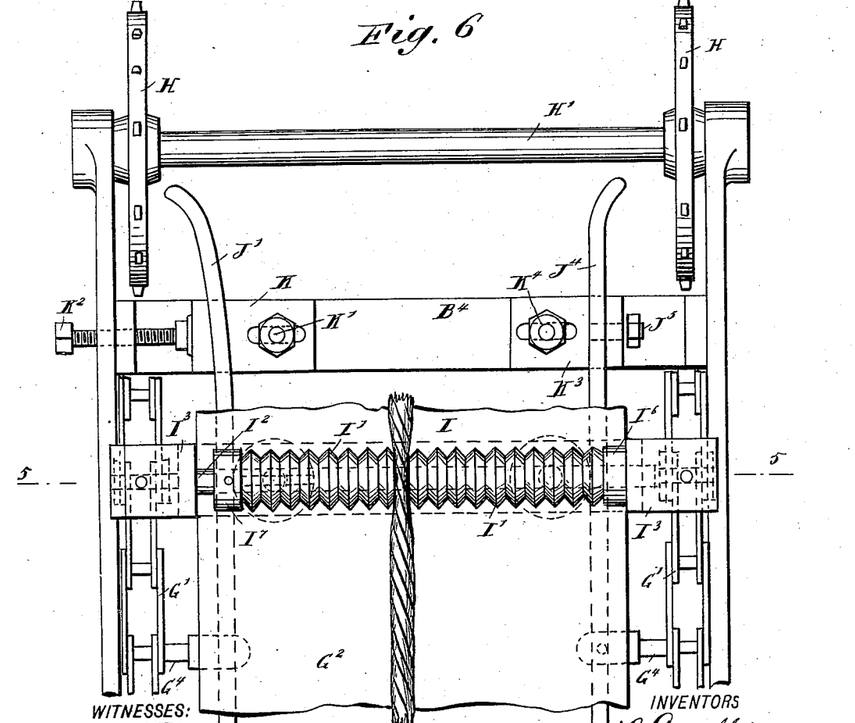
Fig. 6 is a plan view of the same with parts broken out.

On the carrier G are held a series of gripping devices I, placed suitable distances apart and moving with the said carrier, so that the said gripping devices operate to grip and hold the net on top of the upper run of the carrier G, as plainly illustrated in the drawings, the said gripping devices being arranged to engage the lines of the net to clamp the same in place and to carry the lines upward along the carrier-frame, and to finally release the same when reaching the delivery end of the carrier, as hereinafter more fully described. Each of the gripping devices I in the example of our invention as illustrated in the drawings (see detail views, Figs. 5, 6, 7, 8, 9, 10, and 12) consists of a series of jaws in the form of disks I′, made of rubber, wood, metal, or other suitable material or combination of materials, and mounted to slide loosely on a transversely-extending rod I², mounted loosely in suitable bearings formed in the upturned ends of the grip-frame I⁴, which reaches from side to side of the carrier G and is preferably made in the form of a U-shaped transverse bar held on the under side of the carrier with its ends passing up through the same and terminating in the outwardly-extending flanges I³, which are fastened to the upper side of the link-chains, so as to move with them. The flanges I³ of the frame I⁴ are provided with downwardly-extending projections I⁵, attached to the chains G′, as will be readily understood by reference to Fig. 5. The grip-frame I⁴ thus takes the place of some of the slats G³, removed for this purpose.

Instead of using the projection I⁵ it may be dispensed with and the flange I³ be attached directly to the chain or to an ear or lug thereon.

Figure 9:
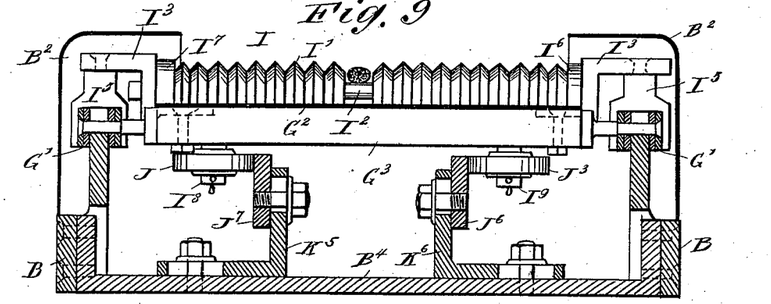
Fig. 9 is an enlarged transverse section of the lower part of the apparatus, the section being taken on the line 9 9 of Fig. 10.
Figure 10:
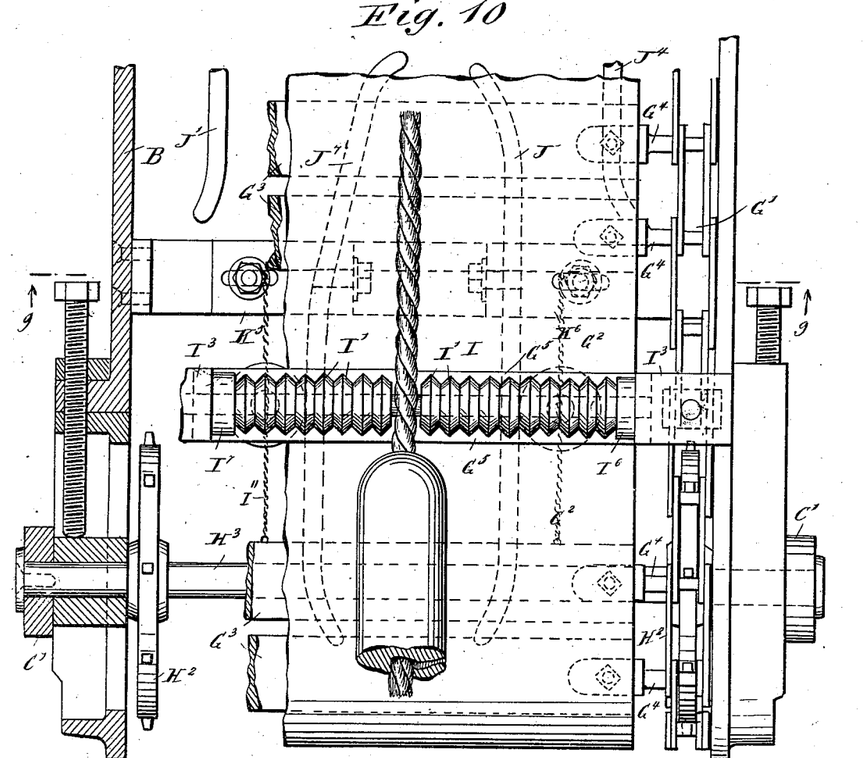
Fig. 10 is a plan view of the same with parts in section and parts broken out.
Figure 11:
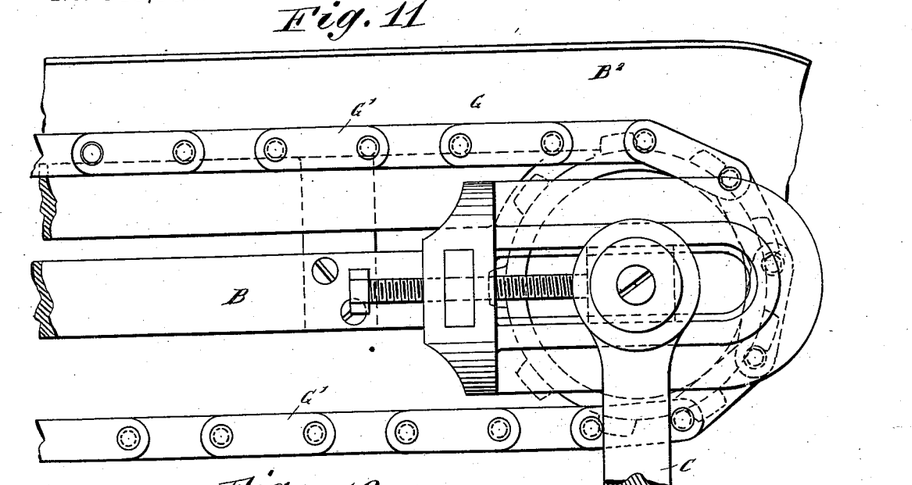
Fig. 11 is an enlarged side elevation of the upper part of the carrier.
Figure 13:
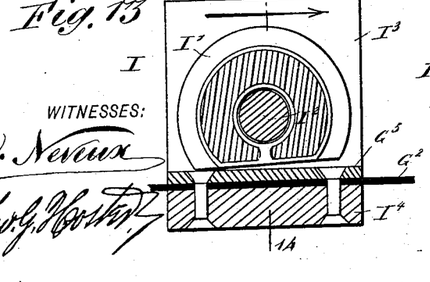
Fig. 13 is an enlarged sectional side elevation of a modified form of the gripping-jaw and adjacent parts.
Figure 14:
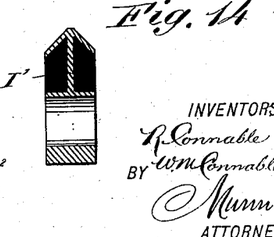
Fig. 14 is a transverse section of the modified forming of gripping-jaw on the line 14 14 of Fig. 13.

On one end of the rod I² is held an elastic disk or spiral or other spring I⁶, abutting against the corresponding end I³ of the frame I⁴ and adapted to be engaged by the first jaw of the series of jaws I′ on that particular rod I². Near the other end of the said rod I² is secured a solid disk or stationary shoulder I⁷, abutting against the end jaw I′, and adapted to abut or rest against the end of the grip-frame I⁴ whenever the line or part of the net is released, as indicated in Figs. 9 and 10. From the grip-rod I² extends downward a stud I⁸, passing through transversely-extending slots formed in the grip-frame I⁴, the belt G², and a strip of non-corroding metal G⁵ for binding the belt in place under the flat bottoms of the jaws I′ and forming a smooth surface on which the lower points of the jaws may slide, as shown in Fig. 13. In the drawings we have shown the jaws supported on a rod; but it is evident that the jaws may be of any suitable form or size and may be hinged or attached in any manner that will permit them to be opened and closed for the purpose of clamping and relieving the nets. We have also shown the said jaws automatically released from their grip upon the net and thereby left in position to receive and grasp the net from the under side as it is lifted from the water. It will be readily understood that any suitable jaw-opening device may be used at the point where the jaws release their grip upon the net.

A preferred form of jaw is one having on one or both faces a groove or plurality of grooves engaging with a jaw having on its face or faces a rib or a plurality of ribs adapted to register and engage with the grooves, and in case more than two jaws were used each jaw would have grooves on one side and ribs on the other, these grooves and ribs preferably radiating on the face either in straight lines or in curves from the center toward the periphery. By this construction, when the net is dropped between any two of the jaws and the jaws grip upon it, the portion of the net between the jaws is curved or bent to fit into the grooves and is held therein by the ribs, which gives a much firmer grasp upon the net than would jaws having flat surfaces. This form of the jaw has also the advantage of securely retaining the net and yet grasping it in such a manner as not to injure it in any way. It will be understood that the form of the groove and the rib may be varied without departing from the spirit of our invention.

Figure 15:
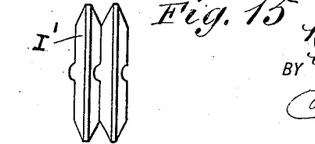
Fig. 15 is a plan view of another form of gripping-jaw.

We deem the form of groove and rib preferable which inclines in the direction the net and carrier may be moving, as seen in Fig. 13, for it will be readily seen that any slipping of the nets in such case would be checked by the tendency of said grooves and ribs to throw the nets or lines more deeply into the jaws and more heavily upon the rod $I^2$. (See Fig. 15.)

On the lower end of the stud $I^8$ is journaled a wheel J, adapted to travel on the inner face of a longitudinally-extending rail $J'$, held vertically adjustable by a bolt $J^2$ in an L-shaped bracket K, held transversely adjustable by a bolt $K'$ on a connecting-bar $B^4$, extending transversely and connecting the two sides of the carrier-frame B with each other. (See Figs. 5, 6, 9, and 10.) The ends of the rail $J'$ are slightly curved outward, so as to permit a convenient entrance and exit of the wheels J as the carrier G is moved along. The bracket K is adapted to be adjusted transversely whenever the bolt $K'$ is slackened by a bolt $K^2$ screwing in the side of the frame B and abutting with its inner end on the bracket K.

On the under side of the grip-frame $I^4$ of each gripping device I is secured a downwardly-extending stud $I^9$, carrying a wheel $J^3$, similar to the wheel J, and adapted to travel on the inner face of a rail $J^4$, likewise held vertically adjustable by a bolt $J^5$ in a bracket $K^3$, held transversely adjustable by a bolt $K^4$ on the connecting-bar $B^4$. If found desirable, a second set of rails $J^6$ and $J^7$ are arranged in the delivery end of the frame B, and these rails $J^6$ and $J^7$ are adapted to be engaged on their outer faces by the wheels J and $J^3$, so that the gripping devices are opened to release the ropes, lines, or other parts of the net, as hereinafter more fully described. The rails $J^6$ and $J^7$ are held vertically adjustable in brackets $K^5$ and $K^6$, held transversely adjustable on connecting-bars $B^4$, connecting the sides of the frame B with each other. The second set of rails may be dispensed with and a spring be so placed as to engage the wheel J the instant it passes the end of the rail $J'$, throwing it in the direction for relieving the gripping-pressure from the jaws. Now, when a gripping device passes onto the lower end of the upper run of the carrier G, then the jaws $I'$ are loose and the net drawn under tension over the jaws separates the jaws and passes between them in position to be gripped. When the rod $I^2$ is driven to such a position that the disk or stationary shoulder $I^7$, fixed on the said rod, presses the several jaws $I'$ together, the rope, line, or other portion of the net between two adjacent jaws is securely clamped in position. (See Figs. 5 and 6.) As the carrier G moves farther onward, it carries this rope or part of the net, line, &c., with it, until the wheel J finally moves in contact with the inclined end of the rail or spring $J^7$, whereby the said wheel is pushed outward and a shifting in a like direction of the rod $I^2$ takes place, so that the disk or shoulder $I^7$ releases the previously-pressed jaws $I'$ and the rope, line, or portion of the net is released from between the clamped jaws. (See Figs. 9 and 10.)

The rails $J^7$ and $J^6$ are alternately engaged by the wheels $J^3$ of each gripping device; but the said rails are arranged in such a manner that no shifting whatever of the frames $I^4$ and the carrier G takes place, lateral displacement of the chains $G'$ is prevented, and sufficient resistance is afforded to permit the wheels J to change the position of the rod $I^2$, as previously explained. Thus it will be seen that the gripping devices engage and clamp the line or part of the net at the lower part of the carrier and hold the same clamped until the delivery end of the frame is reached, so that the said net or rope is clamped and drawn inward to lift the net and then released.

In lifting ordinary fishing-nets from the water the two side lines and web generally assume the form of a single cord or rope about one-half inch in diameter. The gripping-jaws are therefore so arranged that the aggregate width of the openings or the width of a single opening will not exceed one-half inch, which is always sufficient to receive and grip the net, but too narrow to receive the floats, leads, or fish, all of which will readily ride over the gripping device without injury.

Figure 12:
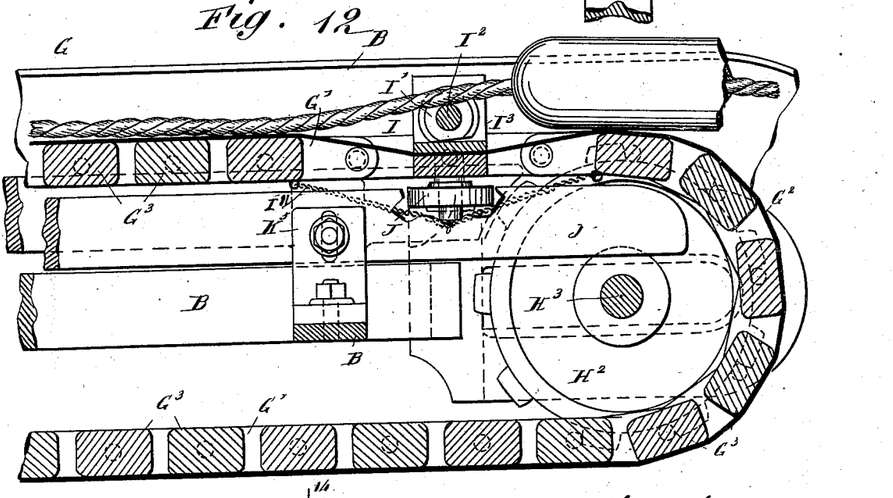
Fig. 12 is a sectional side elevation of the same.

We have referred to a construction for ordinary fishing-nets. In case nets are used which require more or less space between the gripping-jaws the device can be adapted to the nets designed to be used. The bottoms of the gripping-jaws $I'$ are flattened, as illustrated in Figs. 1, 12, and 13, so as to prevent them from revolving and loosening their hold on the nets. The flattened portions are adapted to engage the metal strip $G^5$, extending under the said disks, as previously explained. The several jaws I' in the immediate neighborhood of the stud I⁸ are formed with downwardly-extending slots for the passage of the said studs I⁸ as they are moved transversely, caused by the action of the wheels J on the rails J' and J⁴. On the under side of the grip-frame I⁴ there is a small chain I¹¹ attached, one end of which is fastened in front and the other end behind said frame and holds the frame at a right angle with the carrier while the wheels J and J³ are passing between the tracks J' and J⁴ on the upper run of the carrier.

The ropes, lines, and other parts of the net are guided to the lower parts of the carrier G by longitudinally-extending inclined guiding-flanges L L', secured to brackets L², attached to the sides of the frame B. On the upper edges of the said flanges L are arranged guiding-rollers N N', respectively journaled on suitable studs forming part of the brackets L². The inner faces of the said guiding-rollers N N' extend a suitable distance inward and beyond the inner faces of the hoods B², so as to properly guide the lines or parts of the nets onto the carrier G.

The operation is as follows: When several parts are in the position illustrated in Fig. 1, then the lower end of the frame B, with the guiding device, extends preferably beyond the side of the marine vessel A, so that the lines of the net can be readily passed between the said guiding device, onto the carrier, and to the gripping devices. While the gripping-jaws are on the lower run of the carrier and moving toward the front or receiving end of the carrier, the jaws are loose on the grip-rod I² and free to move in either direction on said rod. In that position they approach the string of nets which is being lifted from the water, and before the gripping-jaws have quite reached the upper side of the carrier they have passed under said string of nets and are supporting the entire weight.

Owing to the tapering edge of the several jaws, this weight or tension of the nets is thrown between some two or more of the jaws, which causes them to separate sufficiently to admit the line or lines which then rest upon the grip-rod I². Then by a further movement of the carrier the automatic pressure heretofore explained grips the nets between the jaws with sufficient force to draw them from the water with the same speed with which the carrier is moving.

The carrier is of sufficient length to carry several grip-bars on the upper side, which retain their hold upon the nets, while each in its turn has the pressure on its jaws automatically removed near the delivery end of the carrier, and the nets fall from the inverted grips as they start down the lower run of the carrier. As the nets are thus drawn from the water with a continuous and uniform inward movement, the strain upon them and the liability to breakage are reduced to a minimum.

The machine stands preferably near the pilot-house, so that the wheelman regulates the speed of the net-lifting device, which is only limited by the ability of the crew to clear the fish from the nets as they fall upon a table around which the workmen stand. The device is mounted yieldingly on the springs F', so as to cause the frame to readily adjust itself to extra strains on the nets or the line already gripped, so that the marine vessel by its constant up-and-down movement on the waves will not effect an accidental release or breakage of the gripped lines.

We have shown and described our preferred mechanism for carrying out our invention; but it is evident that a drum, reel, or other well-known mechanism may be used for giving the continuous forward movement to the clamping-jaws, which alternately grip and relieve the net as it is lifted and drawn in, and that the form of the clamping-jaws and the mechanism for operating them may be varied without departing from the spirit of our invention.

Having thus described our invention, we claim as new and desire to secure by Letters Patent—

1. An apparatus for lifting nets, comprising an endless carrier, and gripping devices carried by the carrier, said gripping devices being normally closed and adapted to be opened by the stress of the net and to automatically grip the net when opened thereby, as specified.

2. An apparatus for lifting nets, comprising an endless carrier, gripping devices carried by the carrier, said gripping devices being normally closed and adapted to be opened by the stress of the net and to automatically grip the net when opened thereby, and means for automatically releasing the gripping devices from the net, as set forth.

3. In an apparatus for lifting nets and lines, the combination of a plurality of jaws, an endless carrier for said jaws, suitable mechanism for clamping said jaws upon nets or lines as the same are drawn from the water, and suitable mechanism for releasing the grip of the said jaws at a point where the free end of the net is discharged, substantially as described.

4. An apparatus for lifting nets, comprising an endless carrier, and a plurality of gripping devices arranged transversely on the carrier and adapted to grip and release the net, as and for the purpose set forth.

5. An apparatus for lifting nets and lines, comprising an endless carrier, and gripping devices carried by the carrier, each of such gripping devices, consisting of a series of independent jaws arranged transversely of the carrier, whereby the net may be gripped at one or more points and the facility with which it is gripped, increased, as set forth.

6. In an apparatus for lifting nets or lines, an endless carrier provided with a plurality of clamping jaws adapted to be opened by the stress of the nets, and a suitable mechanism for clamping the jaws upon the nets, substantially as described.

7. In an apparatus for lifting nets and lines, a plurality of clamping jaws having inclined openings at their outer ends whereby the net may automatically open said jaws a sufficient width to receive the net, an abutting surface for limiting the opening movement of the jaws, an endless carrier supporting said jaws, and suitable mechanism for clamping said jaws upon the net, substantially as described.

8. In an apparatus for lifting nets and lines, a plurality of clamping jaws, a carrier supporting said clamping jaws and conveying the same in contact with the under side of the net, and carrying said net clamped to the point where the free end of the net is discharged, and means for releasing the said net, substantially as described.

9. In an apparatus for lifting nets and lines, the combination of a plurality of clamping jaws adapted to open sufficiently to receive the net, an abutting surface to limit the opening to the required width, an endless carrier supporting said jaws, clamping devices for automatically closing said jaws, and means for automatically releasing the same, substantially as described.

10. In an apparatus for lifting nets and lines, the combination of a plurality of clamping jaws adapted to be opened by the stress of the nets sufficiently to receive the net, an abutting surface to limit the opening to the required width, an endless carrier supporting said jaws and conveying them in contact with the under side of the nets, clamping devices for automatically closing said jaws, and means for automatically releasing or opening the same, substantially as described.

11. In an apparatus for lifting nets and lines, the combination of an endless carrier, a series of clamping jaws supported by and traveling with said carrier, mechanism for clamping the net between said jaws as it is drawn from the water and conveying the same to the opposite side of the carrier, and automatic mechanism for releasing the free end of the net from the said jaws, substantially as described.

12. An apparatus for lifting nets and lines, comprising a carrier frame, an endless carrier traveling in said frame, gripping devices secured on the said carrier and each comprising a plurality of jaws held loosely on a support, and an automatically controlled compressing device for closing said jaws to clamp the net or line between adjacent jaws, substantially as shown and described.

13. An apparatus for lifting nets and lines, comprising a pivotally and yieldingly mounted support or frame adapted to swing sidewise, an endless carrier supported by said frame, gripping devices held on the said carrier, and a guiding device near the receiving end of the said frame, to guide the lines and nets onto the said carrier and the said gripping jaws, substantially as shown and described.

14. In an apparatus for lifting nets and lines, a plurality of suitably supported clamping jaws, one jaw provided with a groove or depression, and its corresponding jaw provided with a rib or projection adapted to fit in the depression in its corresponding jaw for the purpose of more securely grasping the net, and an endless carrier moving said jaws from the point where the net is automatically clasped or gripped to the point where it is automatically loosened, substantially as described.

15. In an apparatus for lifting nets and lines, an endless carrier, and a plurality of clamping jaws supported on said endless carrier, each set of clamping jaws, consisting of a jaw provided with a groove on its face that stands at an acute angle with the line of nets as they are drawn from the water, and its corresponding jaw provided with a rib adapted to engage with the groove on its corresponding jaw for the purpose of receiving and securely clamping the net and giving to the net a continuous forward motion from the point where the said net is grasped by the jaws to the point where the free end is released, substantially as described.

16. An apparatus for lifting nets and lines, provided with a carrier frame, an endless traveling carrier mounted in the said frame, gripping devices held on the said carrier and placed suitable distances apart, each gripping device comprising a transversely slidable rod, jaws held loosely on the said rod and adapted to be pressed together by a fixed disk or shoulder on the said rod, a wheel journaled on the said rod, and rails held on the said frame and adapted to be engaged by said wheel, to impart a transverse shifting motion to the said rod, substantially as shown and described.

17. An apparatus for lifting nets and lines, comprising a frame, carrier chains mounted to travel in the said frame, slats supported by the said chains, a belt attached to or resting on the said slats, transversely-extending bars attached to the said belt and connected with the said chains, rods fitted to slide in the said bars, clamping jaws held loosely on each of the said rods, a fixed disk or shoulder held on the said rod, a stud secured on the said rod and carrying a wheel, and rails or springs combined and adapted to be alternately engaged by the said wheel, to impart a transverse shifting motion to the said rod, to loosen or open and close the said jaws for clamping the net or line, substantially as shown and described.

18. An apparatus for lifting nets and lines, comprising a frame, carrier chains mounted to travel in the said frame, slats supported by the said chains, a belt attached to or resting on the said slats, transversely-extending bars attached to the said belt and connected with the said chains, rods fitted to slide in the said bars, clamping jaws held loosely on each of the said rods, a fixed disk or shoulder held on the said rod, a stud secured on the said rod and carrying a wheel, rails or springs combined, adapted to be alternately engaged by the said wheel, to impart a transverse shifting motion to the said rod and loosen or open and close the said jaws for clamping the net or line, so arranged as to prevent a lateral shifting of the carrier and chains, a second set of wheels held on the said bars, and a second set of rails or a spring adapted to be engaged by the said wheels, substantially as shown and described.

RALPH CONNABLE.
WALTER M. CONNABLE.

Witnesses:
WM. H. OHLE,
R. C. AMES.